US011208919B2

United States Patent
Senn et al.

(10) Patent No.: US 11,208,919 B2
(45) Date of Patent: Dec. 28, 2021

(54) DIFFUSOR DEVICE FOR AN EXHAUST GAS TURBINE

(71) Applicant: ABB Schweiz AG, Baden (CH)

(72) Inventors: Stephan Senn, Remigen (CH); Christoph Mathey, Fislisbach (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/756,384

(22) PCT Filed: Oct. 17, 2018

(86) PCT No.: PCT/EP2018/078397
§ 371 (c)(1),
(2) Date: Apr. 15, 2020

(87) PCT Pub. No.: WO2019/076980
PCT Pub. Date: Apr. 25, 2019

(65) Prior Publication Data
US 2020/0277879 A1    Sep. 3, 2020

(30) Foreign Application Priority Data
Oct. 19, 2017    (DE) .................... 10 2017 124 467.0

(51) Int. Cl.
*F01D 25/30*    (2006.01)
*F02B 37/18*    (2006.01)

(52) U.S. Cl.
CPC ............ *F01D 25/30* (2013.01); *F02B 37/183* (2013.01); *F05D 2220/40* (2013.01); *F05D 2240/12* (2013.01)

(58) Field of Classification Search
CPC .. F01D 25/30; F05D 2240/12; F05D 2220/40; F02B 37/183
See application file for complete search history.

(56) References Cited

U.S. PATENT DOCUMENTS

| 4,391,564 A * | 7/1983 | Garkusha ................ F01D 25/30 415/126 |
| 5,077,967 A * | 1/1992 | Widener ................... F23R 3/04 415/208.1 |
| 2011/0200421 A1* | 8/2011 | Gallier .................... F01D 25/30 415/1 |

FOREIGN PATENT DOCUMENTS

| DE | 19818873 A1 | 11/1999 |
| DE | 10150527 A1 | 6/2002 |

(Continued)

OTHER PUBLICATIONS

JP-2000204908-A English Translation (Year: 2000).*
(Continued)

*Primary Examiner* — Shafiq Mian
(74) *Attorney, Agent, or Firm* — Armstrong Teasdale LLP

(57) ABSTRACT

The invention relates to an exhaust gas turbine, comprising a turbine rotor (12) having a plurality of turbine rotor blades (2) with a turbine rotor blade height H. The exhaust gas turbine further comprises a diffuser arrangement (20) having a transverse diffuser (1) and an exhaust gas collection chamber (9). The transverse diffuser (1) is arranged downstream of the turbine rotor blades (2). The transverse diffuser (1) has a curved diffuser channel (13) which opens into the exhaust gas collection chamber (9) at a diffuser channel outlet (17). A M/H ratio between an axial extension M of the exhaust gas collection chamber (9) and the turbine rotor blade height H has a value of $1.0 \leq M/H \leq 4.6$ and a P/H ratio between a radial extension P of the diffuser arrangement (20) and the turbine rotor blade height H has a value of $2.7 \leq P/H \leq 4.9$. A D/H ratio between a radial expansion D of the diffuser channel section (13) and the turbine rotor blade height H has a value of $2.5 \leq D/H \leq 3.0$ and a R/H ratio between a turbine hub radius R and the turbine rotor blade height H has a value of $1.1 \leq R/H \leq 1.5$.

20 Claims, 2 Drawing Sheets

(56) References Cited

FOREIGN PATENT DOCUMENTS

| DE | 10137899 C1 | | 4/2003 | | |
|----|---|---|---|---|---|
| DE | 102005047216 A1 | | 4/2007 | | |
| JP | 2000204908 A | * | 7/2000 | | |
| JP | 2000204908 A | | 7/2000 | | |
| WO | 2008023068 A2 | | 2/2008 | | |
| WO | WO-2008023068 A2 | * | 2/2008 | ............. | F01D 9/026 |

OTHER PUBLICATIONS

WO-2008023068-A2 English Translation (Year: 2008).*
German Patent Office, Search Report for DE 10 2017 124 467.0, dated Sep. 7, 2018, 12 pages (including partial translation).
EPO, International Search Report for PCT/EP2018/078397, dated Apr. 12, 2019, 6 pages (including translation).
EPO, Written Opinion of the International Searching Authority for PCT/EP2018/078397, dated Apr. 12, 2019, 13 pages (including translation).
Examination Report for IN 202047020525 dated Dec. 22, 2020, 5 pages.

* cited by examiner

DIFFUSOR DEVICE FOR AN EXHAUST GAS TURBINE

CROSS-REFERENCE TO RELATED APPLICATIONS

This application is a national stage entry under 35 U.S.C. § 371 of PCT International Application No. PCT/EP2018/078397, filed Oct. 17, 2018, which claims priority to German Patent Application No. 10 2017 124 467.0, filed Oct. 19, 2017. The entire disclosures of the foregoing applications are incorporated herein by reference.

TECHNICAL FIELD

The invention relates to the field of exhaust gas turbochargers for supercharged internal combustion engines. In particular, the invention relates to a diffusor arrangement of an exhaust gas turbine of an exhaust gas turbocharger.

TECHNICAL BACKGROUND

In order to increase the output of an internal combustion engine, exhaust gas turbochargers are currently used as standard, having a turbine in the exhaust gas tract of the internal combustion engine and having a compressor which is arranged upstream of the internal combustion engine. The exhaust gases of the internal combustion engine are in this instance decompressed in the turbine. The work gained in this instance is transmitted by means of a shaft to the compressor which compresses the air supplied to the internal combustion engine. As a result of the use of the energy of the exhaust gases to compress the air supplied to the combustion process in the internal combustion engine, the combustion process and the degree of efficiency of the internal combustion engine can be optimized.

In exhaust gas turbines known from the prior art, the pressure recovery on the exhaust gas turbine output is typically produced by means of diffusors which can be constructed, for example, in an annular manner and in a linearly conical manner. In this instance, the flow is slowed in an axial direction. Furthermore, a redirection of the flow in a radial direction can be subsequently carried out and the exhaust gas can be supplied to an exhaust gas collection space.

It has been found that with such diffusors of exhaust gas turbines known from the prior art the pressure recovery still leaves room for improvement. In particular, it has been found that, in the diffusors known from the prior art, flow separations occur, for example, with the radial flow redirection, which has an unfavorable effect on the pressure recovery.

BRIEF STATEMENT OF INVENTION

The object of the present invention is to provide an exhaust gas turbine having a diffusor arrangement which is improved with respect to exhaust gas diffusors known from the prior art. In particular, an object of the present invention is to provide an exhaust gas turbine with a diffusor arrangement which has improved pressure recovery and a more compact construction.

In order to solve the above-mentioned objective, an exhaust gas turbine according to independent claim 1 is provided. Other aspects, advantages and features of the present invention can be derived from the dependent patent claims, the description and the appended figures.

According to an aspect of the invention, an exhaust gas turbine is provided. The exhaust gas turbine comprises a turbine rotor having a multiplicity of turbine rotor blades with a turbine rotor blade height H. The exhaust gas turbine further comprises a diffusor arrangement having a transverse diffusor and an exhaust gas collection space. The transverse diffusor is arranged downstream of the turbine rotor blades. The transverse diffusor has a curved diffusor channel which opens at a diffusor channel outlet in the exhaust gas collection space. A ratio M/H between an axial extent M of the exhaust gas collection space and the turbine rotor blade height H has a value of $1.0 \leq M/H \leq 4.6$ and a ratio P/H between a radial extent P of the diffusor arrangement and the turbine rotor blade height H has a value of $2.7 \leq P/H \leq 4.9$. A ratio D/H between a radial extent D of the diffusor channel and the turbine rotor blade height H has a value of $2.5 \leq D/H \leq 3.0$ and a ratio R/H between a turbine hub radius R and the turbine rotor blade height H has a value of $1.1 \leq R/H \leq 1.5$.

Consequently, there is provided an exhaust gas turbine having a diffusor arrangement which is improved with respect to exhaust gas turbines known from the prior art. In particular, as a result of the exhaust gas turbine according to the invention, there is provided an exhaust gas turbine with an improved diffusor design, which enables an improved pressure recovery at the exhaust gas turbine outlet. Furthermore, there is provided a diffusor arrangement for an exhaust gas turbine which has a more compact construction, in particular a more compact construction in an axial direction. The compact construction in an axial direction additionally enables a uniform discharge from the exhaust gas collection space in a downstream direction, whereby flow losses are reduced.

According to another aspect of the invention, an exhaust gas turbocharger having an exhaust gas turbine according to one of the embodiments described herein is provided so that an improved exhaust gas turbocharger can advantageously be provided.

BRIEF DESCRIPTION OF THE FIGURES

The invention is intended to be explained below with reference to embodiments illustrated in the figures and from which other advantages and modifications can be derived. In the drawings.

DETAILED DESCRIPTION OF THE FIGURES

Figure 1:
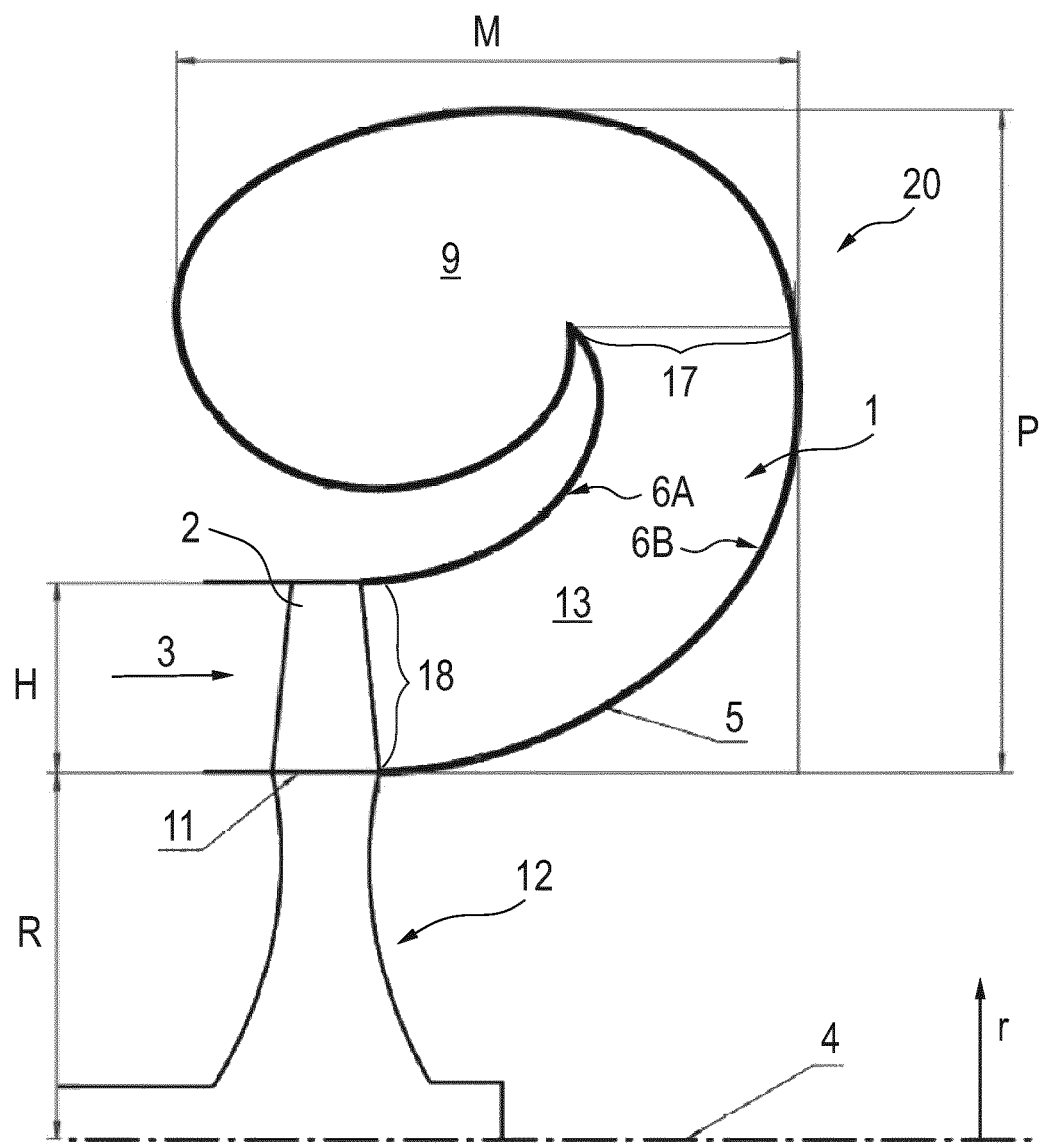
FIG. 1 is a schematic, longitudinal sectional view of a portion of an exhaust gas turbine having a diffusor arrangement according to embodiments described herein.

FIG. 1 is a schematic, longitudinal sectional view of a portion of an exhaust gas turbine according to embodiments described herein.

In particular, FIG. 1 shows a portion of an exhaust gas turbine comprising a turbine rotor 12 having a multiplicity of turbine rotor blades 2 with a turbine rotor blade height H. Typically, the turbine rotor 12 is rotatably supported about a rotation axis 4. In the sectional view of FIG. 1, a turbine rotor blade 2 with the turbine rotor blade height H is illustrated by way of example. Furthermore, the exhaust gas turbine comprises a diffusor arrangement 20 with a transverse diffusor 1 and an exhaust gas collection space 9.

Figure 2:
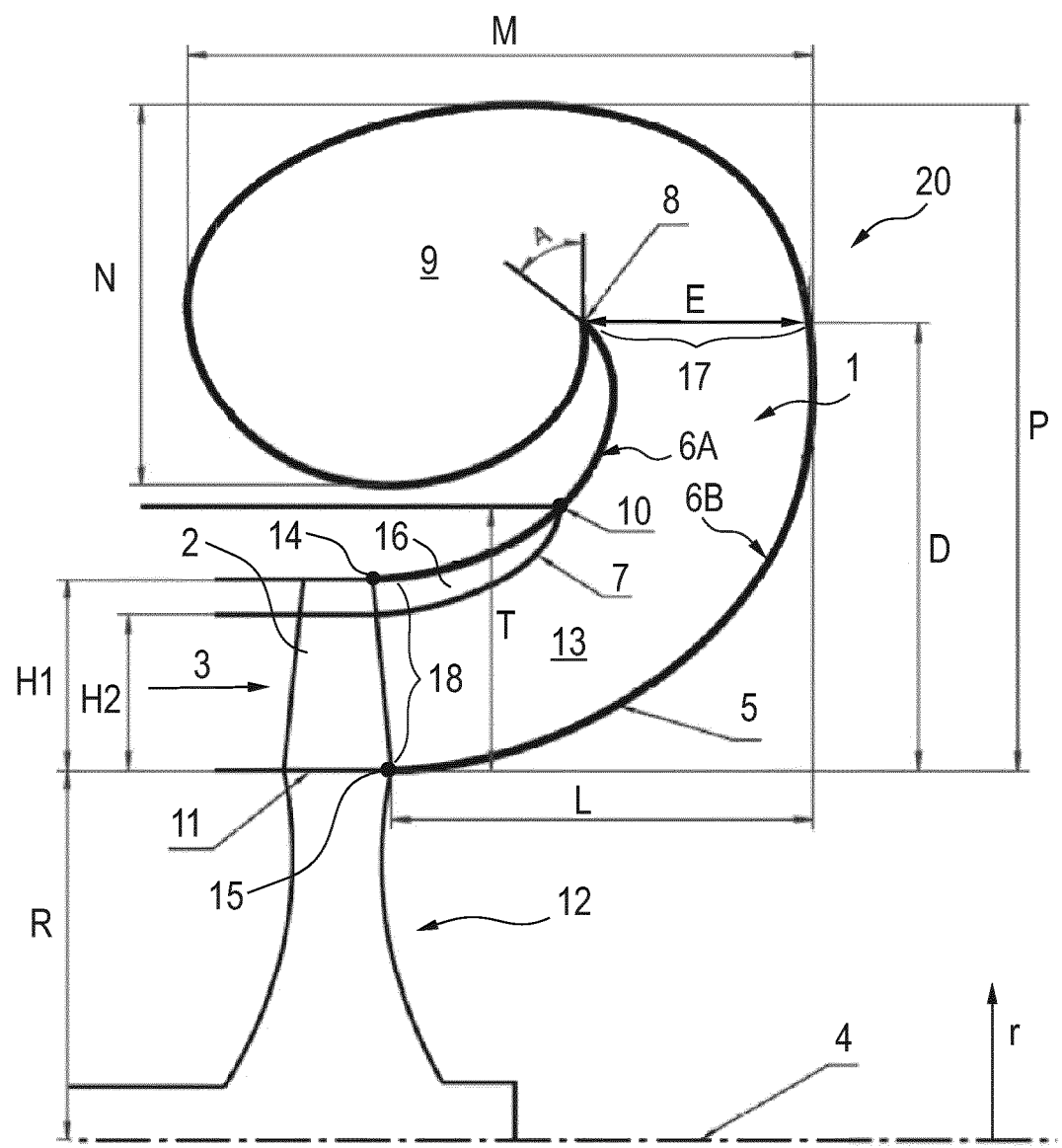
FIG. 2 is a longitudinal sectional view of a portion of an exhaust gas turbine having a diffusor arrangement according to other embodiments described herein.

The transverse diffusor 1 is arranged downstream of the turbine rotor blades 2. The flow direction 3 of the exhaust gas is depicted in FIGS. 1 and 2 with an arrow. Furthermore, the diffusor arrangement 20 comprises a diffusor housing 5, as illustrated by way of example in FIG. 1. The transverse diffusor 1 has a curved diffusor channel 13. Typically, the diffusor channel 13 has a diffusor channel inlet 18 and a diffusor channel outlet 17. In particular, the diffusor channel inlet 18 is constructed so as to direct exhaust gas in the flow direction 3 into the diffusor channel 13.

In this context, it should be noted that a transverse diffusor is to be understood as a diffusor which from a structural viewpoint represents a combination of a linear axial diffusor with a curved diagonal diffusor. In a linear axial diffusor, a slowing of the flow occurs by means of increasing the diffusor channel cross-section in a flow direction. In a curved diagonal diffusor, a slowing of the flow occurs by means of an increasing radial position of the diffusor channel cross-section in the flow direction. In a transverse diffusor, the flow is slowed by means of both mechanisms, that is to say, by means of a variation of the diffusor channel cross-section and by means of an increasing radial position of the diffusor channel cross-section.

As shown by way of example in FIG. 1, the diffusor channel inlet 18 typically extends in a radial direction r over the turbine rotor blade height H. The diffusor channel 13 opens at the diffusor channel outlet 17 in the exhaust gas collection space 9. In particular, the diffusor channel 13 is bent or curved radially outward, as illustrated by way of example in FIG. 1. The exhaust gas collection space has an axial extent M and the diffusor arrangement has a radial extent P. In FIGS. 1 and 2, the axial direction corresponds to the direction of the rotation axis 4 of the turbine rotor 12. The radial direction r is illustrated in FIGS. 1 and 2 by means of an arrow. According to embodiments described herein, a ratio M/H between the axial extent M of the exhaust gas collection space 9 and the turbine rotor blade height H has a value of $1.0 \leq M/H \leq 4.6$. In particular, the ratio M/H has a value of $3.467 \leq M/H \leq 3.679$. Furthermore, a ratio P/H between a radial extent P of the diffusor arrangement 20 and the turbine rotor blade height H has a value of $2.7 \leq P/H \leq 4.9$. In particular, the ratio P/H has a value of $3.779 \leq P/H \leq 4.010$.

It has been found that the embodiments of the exhaust gas turbine as described herein, in particular the design concept of the diffusor arrangement described herein has particular advantages with respect to the pressure recovery whilst at the same time producing an axial compact structural space size so that, in comparison with exhaust gas turbines known from the prior art, an improved exhaust gas turbine is provided.

Furthermore, the design concept of the diffusor arrangement described herein has the advantage that it can be adapted to different turbine rotor blade heights, wherein at the same time an optimal pressure recovery within a shorter axial length of the diffusor is achieved, such that a turbine stage which is more compact in an axial direction and consequently a more compact turbocharger can be produced. A more compact construction is particularly advantageous due to structural space limitations in the engine.

Furthermore, in the embodiments of the diffusor arrangement described herein, flow separation losses are minimized as a result of a gentle and continuous rotation of the flow from the axial direction into the radial direction and as a result of the variation of the diffusor channel cross-section in the flow direction. The variation is adapted to the flow relationships so that the risk of a separation of the flow is reduced or even eliminated.

According to an embodiment which can be combined with any other embodiments described herein, the turbine rotor blade height H is selected from a range from a minimum turbine rotor blade height H2 up to a maximum turbine rotor blade height H1. The maximum turbine rotor blade height H1 and the minimum turbine rotor blade height H2 are illustrated by way of example in FIG. 2. A ratio H2/H1 between the minimum turbine rotor blade height H2 and the maximum turbine rotor blade height H1 typically has a value of $0.8 \leq H2/H1 \leq 1.0$.

According to an embodiment which can be combined with any other embodiments described herein, the diffusor channel outlet 17 has an axial extent E, as illustrated by way of example in FIG. 2. In particular, a ratio E/H between the axial extent E of the diffusor channel outlet 17 and the turbine rotor blade height H may have a value of $0.9 \leq E/H \leq 1.8$. In particular, the ratio E/H has a value of $1.052 \leq E/H \leq 1.116$.

According to an embodiment which can be combined with any other embodiments described herein, the diffusor channel 13 has an axial length L as illustrated by way of example in FIG. 2. In particular, a ratio L/H between the axial length L of the diffusor channel 13 and the turbine rotor blade height H may have a value of $1.5 \leq L/H \leq 3.0$. Alternatively, the ratio L/H may have a value of $2.0 \leq L/H \leq 2.7$. In particular, the ratio L/H has a value of $2.312 \leq L/H \leq 2.452$.

According to an embodiment which can be combined with any other embodiments described herein, the diffusor channel 13 has a radial extent D as illustrated by way of example in FIG. 2. Typically, the radial extent D corresponds to the radial distance between the starting location 15 of the second diffusor channel contour 6B and the end location 8 of the first diffusor channel contour 6A. In particular, a ratio D/H between the radial extent D of the diffusor channel 13 and the turbine rotor blade height H may have a value of $2.3 \leq D/H \leq 3.5$. Alternatively, the ratio D/H may have a value of $2.5 \leq D/H \leq 3.0$ In particular, the ratio D/H has a value of $2.623 \leq D/H \leq 2.782$.

According to an embodiment which can be combined with any other embodiments described herein, the turbine rotor 12 has a turbine hub radius R as illustrated by way of example in FIGS. 1 and 2. Typically, the turbine hub radius R extends from the rotation axis 4 of the turbine rotor up to the turbine hub contour 11. In particular, a ratio R/H between the turbine hub radius R and the turbine rotor blade height H may have a value of $1.0 \leq R/H \leq 1.7$. Alternatively, the ratio R/H may have a value of $1.1 \leq R/H \leq 1.5$. In particular, the ratio R/H has a value $1.248 \leq R/H \leq 1.324$.

According to an embodiment which can be combined with any other embodiments described herein, the diffusor channel 13 comprises a first diffusor channel contour 6A, which extends from a starting location 14 of the first diffusor channel contour 6A up to an end location 8 of the first diffusor channel contour 6A, as illustrated by way of example in FIG. 2. Typically, the first diffusor channel contour 6A is opposite a second diffusor channel contour 6B. The starting location 14 of the first diffusor channel contour 6A is arranged further outward in a radial direction than a starting location 15 of the second diffusor channel contour 6B, as shown in FIG. 2 by way of example.

According to an embodiment which can be combined with any other embodiments described herein, the first diffusor channel contour 6A is constructed in such a manner that at the end location 8 of the first diffusor channel contour 6A an opening angle A of the diffusor channel outlet 17 is provided, as shown by way of example in FIG. 2. The opening angle A of the diffusor channel outlet 17 is the angle which is provided between a tangent at the end location 8 of the first diffusor channel contour 6A and the radial direction r. Typically, the opening angle A has a value of 20°≤A≤70°. Alternatively, the opening angle A may have a value of 30°≤A≤60°. In particular, the opening angle A has a value of 40°≤A≤50°.

According to an embodiment which can be combined with any other embodiments described herein, the exhaust gas collection space 9 has a radial extent N, as illustrated by way of example in FIG. 2. In particular, a ratio N/H between the radial extent N of the exhaust gas collection space 9 and the turbine rotor blade height H may have a value of (P−D)/H≤N/H≤(P−H)/H, wherein P is the radial extent of the diffusor arrangement 20, and wherein D is the radial extent of the diffusor channel 13. In particular, the ratio N/H has a value of 2.130≤N/H≤2.260.

According to an embodiment which can be combined with any other embodiments described herein, the diffusor channel 13 may have an insertion element 16. As illustrated by way of example in FIG. 2, the insertion element 16 may be constructed in such a manner that the insertion element 16 provides a third diffusor channel contour 7. Typically, the insertion element 16 is arranged in such a manner that the third diffusor channel contour 7 at a transition location 10 merges into the first diffusor channel contour 6A. As shown in FIG. 2, the transition location 10 has a radial distance T with respect to the starting location 15 of the second diffusor channel contour 6B. In particular, a ratio T/H between the radial distance T and the turbine rotor blade height H has a value of 1.0≤T/H≤(P−N)/H, wherein P is the radial extent of the transverse diffusor, and wherein N is the radial extent of the exhaust gas collection space. In particular, the ratio T/H has a value of 1.334≤T/H≤1.415.

The insertion element 16 may, for example, be constructed in an annular manner. Typically, the insertion element 16 is sized in such a manner that it adapts the opening of the diffusor channel inlet 18. As illustrated in FIG. 2 by way of example, the third diffusor channel contour 7 of the insertion element 16 may be constructed in such a manner that the opening of the diffusor channel inlet 18 is adapted in a radial direction r to the turbine rotor blade height H (in FIG. 2 to the minimum turbine rotor blade height H2).

As can be seen from the embodiments described herein, there is advantageously provided an exhaust gas turbine having a diffusor arrangement which is improved with respect to the exhaust gas turbines known from the prior art. In particular, as a result of the exhaust gas turbine according to the invention, there is provided an exhaust gas turbine with an improved diffusor design, which enables an improved pressure recovery and a more compact structure, in particular a more compact structure in an axial direction Accordingly, when an exhaust gas turbine is used according to one of the embodiments described herein for an exhaust gas turbocharger, an improved exhaust gas turbocharger can advantageously be provided.

Finally, it should be noted that the design of the diffusor arrangement described herein can be adapted accordingly with regard to the required sizing. That is to say, the design of the diffusor arrangement described herein is generally valid and can be transferred to small, medium and large structural space sizes. Furthermore, the diffusor concept described herein can be applied to axial turbines, mixed flow turbines and radial turbines but is not limited to axial turbines, mixed flow turbines and radial turbines. It should further be noted that FIGS. 1 and 2 show a longitudinal sectional view in an x-z plane. Accordingly, the values and ratios set out herein typically relate to a longitudinal section of the embodiments of the diffusor arrangement described herein in the x-z plane, as shown by way of example in FIGS. 1 and 2.

LIST OF REFERENCE NUMERALS

1 Transverse diffusor
2 Turbine rotor blade
3 Flow direction
4 Rotation axis/axial direction
5 Diffusor housing
6A First diffusor channel contour
6B Second diffusor channel contour
7 Third diffusor channel contour
8 End location of the first diffusor channel contour
9 Exhaust gas collection space
10 Transition location between the third diffusor channel contour and first diffusor channel contour
11 Turbine hub contour
12 Turbine rotor
13 Diffusor channel
14 Starting location of the first diffusor channel contour 6A
15 Starting location of the second diffusor channel contour 6B
16 Insertion element
17 Diffusor channel outlet
18 Diffusor channel inlet
20 Diffusor arrangement
r Radial direction
R Turbine hub radius
H Rotor blade height
H1 Maximum turbine rotor blade height
H2 Minimum turbine rotor blade height
L Axial length of the diffusor channel
D Radial extent of the diffusor channel 13
P Radial extent of the diffusor arrangement 20
M Axial extent of the exhaust gas collection space 9
N Radial extent of the exhaust gas collection space 9
E Axial extent of the diffusor channel outlet 17
T Radial distance of the transition location 10 from the starting location 15 of the second diffusor channel contour 6B
A Opening angle of the diffusor channel outlet 17 relative to the radial direction r

The invention claimed is:

1. An exhaust gas turbine comprising:
   a turbine rotor having a plurality of turbine rotor blades with a turbine rotor blade height H, and
   a diffusor arrangement having a transverse diffusor and an exhaust gas collection space,
   wherein the transverse diffusor is arranged downstream of the plurality of turbine rotor blades,
   wherein the transverse diffusor has a curved diffusor channel which opens at a diffusor channel outlet in the exhaust gas collection space,
   wherein a ratio M/H between an axial extent M of the exhaust gas collection space and the turbine rotor blade height H has a value of 1.0≤M/H≤4.6,
   wherein a ratio P/H between a radial extent P of the diffusor arrangement and the turbine rotor blade height H has a value of 2.7≤P/H≤4.9,
   wherein a ratio D/H between a radial extent D of the diffusor channel and the turbine rotor blade height H has a value of 2.5≤D/H≤3.0, and
   wherein a ratio R/H between a turbine hub radius R and the turbine rotor blade height H has a value of 1.1≤R/H≤1.5.

2. The exhaust gas turbine of claim 1, wherein the turbine rotor blade height H is selected from a range from a minimum turbine rotor blade height H2 and a maximum turbine rotor blade height H1, and wherein a ratio H2/H1 between the minimum turbine rotor blade height H2 and the maximum turbine rotor blade height H1 has a value of $0.8 \leq H2/H1 \leq 1.0$.

3. The exhaust gas turbine of claim 1, wherein the diffusor channel outlet has an axial extent E, and wherein a ratio E/H between the axial extent E of the diffusor channel outlet and the turbine rotor blade height H has a value of $1.052 \leq E/H \leq 1.116$.

4. The exhaust gas turbine of claim 1, wherein a ratio L/H between an axial length L of the diffusor channel and the turbine rotor blade height H has a value of $2.312 \leq L/H \leq 2.452$.

5. The exhaust gas turbine of claim 1, wherein a ratio D/H between a radial extent D of the diffusor channel and the turbine rotor blade height H has a value of $2.623 \leq D/H \leq 2.782$.

6. The exhaust gas turbine of claim 1, wherein a ratio R/H between a turbine hub radius R and the turbine rotor blade height H has a value of $1.248 \leq R/H \leq 1.324$.

7. The exhaust gas turbine of claim 1, wherein the diffusor channel comprises a first diffusor channel contour, which extends from a starting location of the first diffusor channel contour to an end location of the first diffusor channel contour and is opposite a second diffusor channel contour, wherein the starting location of the first diffusor channel contour is arranged further outward in a radial direction than a starting location of the second diffusor channel contour.

8. The exhaust gas turbine of claim 7, wherein the first diffusor channel contour is constructed in such a manner that at the end location of the first diffusor channel contour an opening angle A of the diffusor channel outlet is provided, wherein the opening angle A has a value of $40° \leq A \leq 50°$ relative to the radial direction.

9. The exhaust gas turbine of claim 1, wherein a ratio N/H between a radial extent N of the exhaust gas collection space and the turbine rotor blade height H has a value of $(P-D)/H \leq N/H \leq (P-H)/H$, wherein P is the radial extent of the diffusor arrangement, and wherein D is the radial extent of the diffusor channel.

10. The exhaust gas turbine of claim 7, wherein the diffusor channel has an insertion element which provides a third diffusor channel contour, wherein the insertion element is arranged in such a manner that the third diffusor channel contour merges at a transition location into the first diffusor channel contour, wherein the transition location has a radial distance T with respect to the starting location of the second diffusor channel contour, and wherein a ratio T/H between the radial distance T and the turbine rotor blade height H has a value of $1.0 \leq T/H \leq /H$, in particular a value of $1.334 \leq T/H \leq 1.415$, wherein P is the radial extent of the transverse diffusor, and wherein N is the radial extent of the exhaust gas collection space.

11. The exhaust gas turbine of claim 10, wherein the ratio T/H between the radial distance T and the turbine rotor blade height H has a value of $1.334 \leq T/H \leq 1.415$.

12. The exhaust gas turbine of claim 3, wherein a ratio L/H between an axial length L of the diffusor channel and the turbine rotor blade height H has a value of $2.312 \leq L/H \leq 2.452$.

13. The exhaust gas turbine of claim 3, wherein a ratio D/H between a radial extent D of the diffusor channel and the turbine rotor blade height H has a value of $2.623 \leq D/H \leq 2.782$.

14. The exhaust gas turbine of claim 4, wherein a ratio D/H between a radial extent D of the diffusor channel and the turbine rotor blade height H has a value of $2.623 \leq D/H \leq 2.782$.

15. The exhaust gas turbine of claim 3, wherein a ratio R/H between a turbine hub radius R and the turbine rotor blade height H has a value of $1.248 \leq R/H \leq 1.324$.

16. The exhaust gas turbine of claim 3, wherein the diffusor channel comprises a first diffusor channel contour, which extends from a starting location of the first diffusor channel contour to an end location of the first diffusor channel contour and is opposite a second diffusor channel contour, wherein the starting location of the first diffusor channel contour is arranged further outward in a radial direction than a starting location of the second diffusor channel contour.

17. The exhaust gas turbine of claim 3, wherein a ratio N/H between a radial extent N of the exhaust gas collection space and the turbine rotor blade height H has a value of $(P-D)/H \leq N/H \leq (P-H)/H$, wherein P is the radial extent of the diffusor arrangement, and wherein D is the radial extent of the diffusor channel.

18. The exhaust gas turbine of claim 17, wherein the ratio N/H between the radial extent N of the exhaust gas collection space and the turbine rotor blade height H has a value of $2.130 \leq N/H \leq 2.260$.

19. The exhaust gas turbine of claim 9, wherein the ratio N/H between the radial extent N of the exhaust gas collection space and the turbine rotor blade height H has a value of $2.130 \leq N/H \leq 2.260$.

20. An exhaust gas turbocharger having an exhaust gas turbine, the exhaust gas turbine comprising:
 a turbine rotor having a plurality of turbine rotor blades with a turbine rotor blade height H, and
 a diffusor arrangement having a transverse diffusor and an exhaust gas collection space,
 wherein the transverse diffusor is arranged downstream of the plurality of turbine rotor blades,
 wherein the transverse diffusor has a curved diffusor channel which opens at a diffusor channel outlet in the exhaust gas collection space,
 wherein a ratio M/H between an axial extent M of the exhaust gas collection space and the turbine rotor blade height H has a value of $1.0 \leq M/H \leq 4.6$,
 wherein a ratio P/H between a radial extent P of the diffusor arrangement and the turbine rotor blade height H has a value of $2.7 \leq P/H \leq 4.9$,
 wherein a ratio D/H between a radial extent D of the diffusor channel and the turbine rotor blade height H has a value of $2.5 \leq D/H \leq 3.0$, and
 wherein a ratio R/H between a turbine hub radius R and the turbine rotor blade height H has a value of $1.1 \leq R/H \leq 1.5$.

\* \* \* \* \*